United States Patent [19]
Matsuto et al.

[11] Patent Number: 6,158,543
[45] Date of Patent: Dec. 12, 2000

[54] MOTORCYCLE WITH HYBRID DRIVE SYSTEM

[75] Inventors: Takushi Matsuto; Kaoru Wachigai, both of Wako, Japan

[73] Assignee: Honda Giken Kogyo Kabushiki Kaisha, Tokyo, Japan

[21] Appl. No.: 09/403,137

[22] PCT Filed: Sep. 8, 1998

[86] PCT No.: PCT/JP98/04017

§ 371 Date: Oct. 14, 1999

§ 102(e) Date: Oct. 14, 1999

[87] PCT Pub. No.: WO99/14109

PCT Pub. Date: Mar. 25, 1999

[30] Foreign Application Priority Data

Sep. 14, 1997 [JP] Japan ................................. 9-268077

[51] Int. Cl.[7] .................................................. B62D 61/02
[52] U.S. Cl. ........................................ 180/220; 180/65.2
[58] Field of Search .................................... 180/219, 226, 180/220, 227, 228, 291, 292, 299, 230, 65.2, 65.3, 65.4, 65.5, 65.6, 65.7

[56] References Cited

U.S. PATENT DOCUMENTS

| | | | |
|---|---|---|---|
| 732,944 | 7/1903 | Jenatzy | 180/65.6 |
| 1,083,730 | 1/1914 | Collischonn | 180/65.6 |
| 4,579,190 | 4/1986 | Hashimoto et al. | 180/227 |
| 4,763,538 | 8/1988 | Fujita et al. | 180/65.2 X |
| 5,433,266 | 7/1995 | Kumamaru et al. | 180/219 |
| 6,048,289 | 4/2000 | Hattori et al. | 180/65.2 X |

FOREIGN PATENT DOCUMENTS

| | | |
|---|---|---|
| 401044273 | 6/1990 | Japan . |
| 08175477 | 9/1996 | Japan . |
| 2265588 | 10/1993 | United Kingdom . |

*Primary Examiner*—Brian L. Johnson
*Assistant Examiner*—Bryan Fischmann
*Attorney, Agent, or Firm*—Merchant & Gould P.C.

[57] ABSTRACT

A motorcycle (1) is disclosed wherein a crank shaft (56) is disposed in a lower portion of a power unit case (55), a clutch shaft (57) is disposed in parallel to and higher than the crank shaft (56), and a transmission shaft (58) and an electric motor shaft (59) are disposed in such a manner as to extend from one end of the clutch shaft (57) in a longitudinal (fore and aft) direction of the vehicular body. That is, the clutch shaft (57), transmission shaft (58), and electric motor shaft (59) are disposed in series and also in parallel to and higher than the crank shaft (56). Since the transmission shaft (58) and the electric motor shaft (59) are disposed in series in the longitudinal direction of a vehicular body, the direction of a force applied to the power unit case (55) becomes simple. This makes the designing of the power unit case easy.

3 Claims, 8 Drawing Sheets

MOTORCYCLE WITH HYBRID DRIVE SYSTEM

TECHNICAL FIELD

The present invention relates generally to a motorcycle and more particularly to a hybrid motorcycle including an electric motor in addition to an engine.

BACKGROUND ART

Vehicles of the type using a gasoline engine as a drive source are chiefly available at present. However, vehicles of the type using an electric motor as a drive source are required at locations where the occurrence of an exhaust gas must be avoided. A motor-driven vehicle, however, has an inconvenience in that it has an increased body weight and a shortened running distance. To cope with such an inconvenience, there is an increased demand that a hybrid vehicle including an electric motor in addition to an engine be developed.

Japanese Patent Laid-Open Publication No. HEI-8-175477, for example, discloses a hybrid motorcycle entitled 'DEVICE FOR SWITCHING ENGINE POWER TO/FROM MOTOR POWER IN MOTORCYCLE OR THE LIKE'.

As shown in FIG. 2 of the above publication, a crank shaft is parallel to an axle, and as shown in FIG. 3, a shaft of a motor is perpendicular to the axle.

To be more specific, according to the related art structure, since the crank shaft extends in the lateral direction of a vehicular body and the shaft of the motor extends in the longitudinal direction of the vehicular body, a transmission case which contains both the crank shaft and the shaft of the motor is applied with forces both in the lateral and longitudinal directions.

Accordingly, the transmission case must be rigid enough to withstand the above forces both in the lateral and longitudinal directions, which requires an not only increase in the weight of power the transmission case but also causes a loss of power transmission in the power transmission system.

DISCLOSURE OF THE INVENTION

It is therefore an object of the present invention to provide a motorcycle capable of reducing the loss of power transmission in the power transmission system and reducing the weight of the transmission case, that is, the power unit case.

According to the present invention, there is provided a motorcycle in which an engine and an electric motor are provided as a power unit and an engine output and an electric motor output are transmitted to a drive wheel through a transmission shaft and an electric motor shaft, respectively, characterized in that the transmission shaft and the electric motor shaft are coaxially disposed in series in the longitudinal direction of a vehicular body and in parallel to a crank shaft of the engine.

Since the transmission shaft and the electric motor shaft are disposed in series in the longitudinal direction of the vehicular body, the direction of a force applied to the power unit case becomes simple. This reduces a loss of power transmission and makes designing of the power unit case easy. Concretely, the power unit case can have high rigidity in the direction of application of the force and low rigidity in the direction of non-application of the force; consequently, the power unit case can be reduced in weight and also be made compact as a whole in conjunction with the simplification of the applied force.

According to an invention, the transmission shaft holds a one-way clutch and a clutch shaft. The clutch shaft holds a starter one-way clutch for electronic motor and a centrifugal clutch. The clutch shaft and various clutches are provided integrally with the transmission shaft.

The clutch shaft is integrally connected to the transmission shaft; the one-way clutch for electronic motor is held by the transmission shaft; and the one-way clutch for a starter and the centrifugal clutch are held by the clutch shaft. According to another aspect invention, the power unit is swingably mounted, together with a rear wheel, on a main frame.

With this arrangement, since the power unit can be significantly reduced in weight and also the power unit is swung together with the rear wheel, the unspring weight can be reduced and the steering stability can be enhanced.

BRIEF DESCRIPTION OF THE DRAWINGS

Preferred embodiments of the present invention will be described in detail below, by way of example only, with reference to the accompanying drawings, in which.

BEST MODE FOR CARRYING OUT THE INVENTION

The following description is merely exemplary in nature and is in no way intended to limit the invention or its application or uses.

Figure 1:
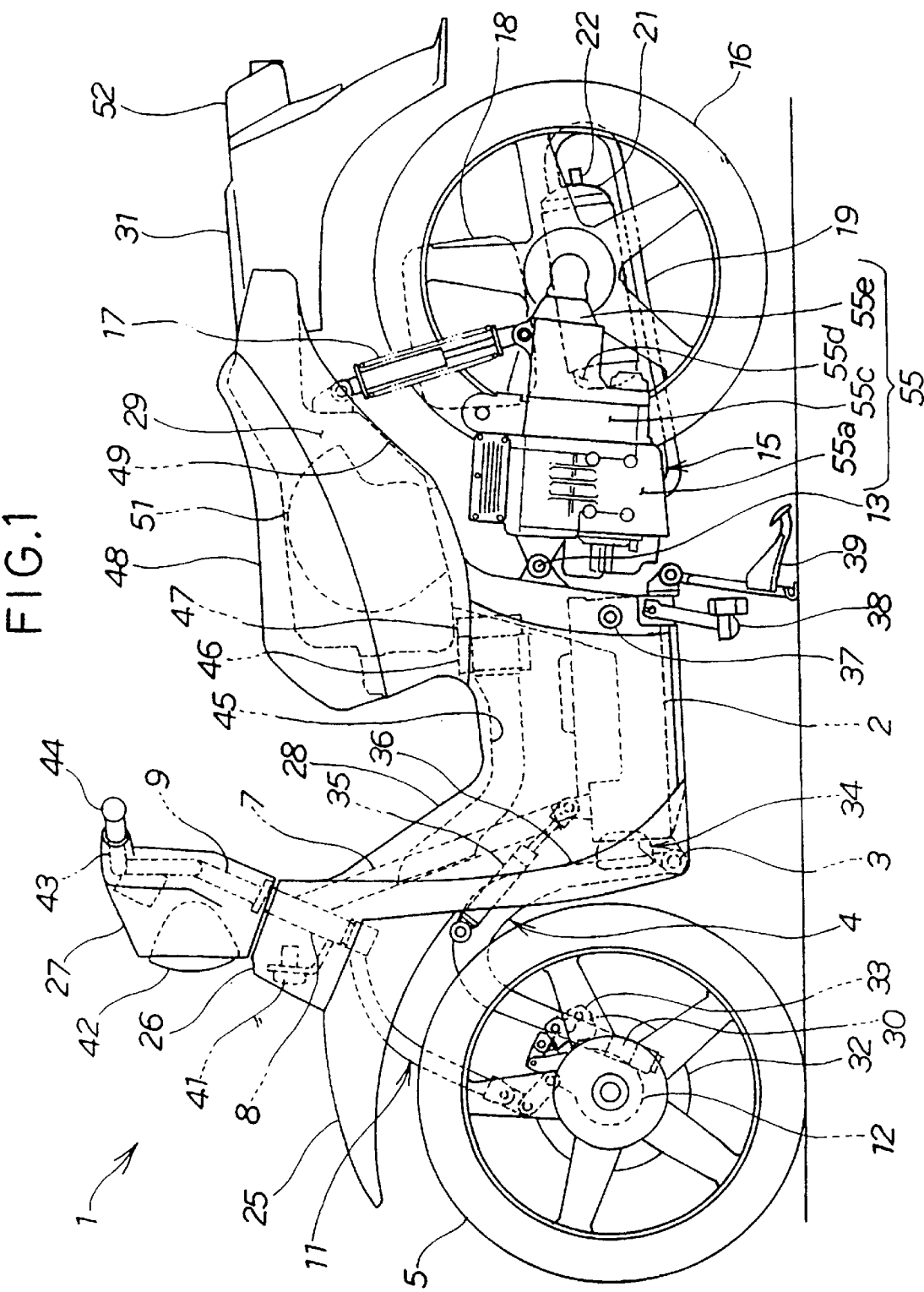
FIG. 1 is a side view of a motorcycle according to the present invention.

Referring to FIG. 1, a motorcycle 1 has at its lower central portion a box-like main frame 2 serving as a battery containing box. Inverse U-shaped front swing arms 4 extend from a lower front portion of the main frame 2 through a front pivot 3, and a front wheel 5 is rotatably mounted on the front swing arms 4. A head pipe post 7 extends obliquely upward from an upper front portion of the main frame 2 and a head pipe 8 is fixed at a leading end of the head pipe post 7. A handle post 9 is rotatably mounted in the head pipe 8, and a steering arm 11 is mounted on a lower end of the handle post 9. A leading end (lower end) of the steering arm 11 is connected to a knuckle 12 mounted on the front wheel 5. A power unit 15 is swingably mounted on an upper rear portion of the main frame 2 through a rear pivot 13. A rear wheel 16 is mounted on the power unit 15. A rear cushion 17 is disposed in front of the rear wheel 16, and an air cleaner 18, an exhaust pipe 19, a muffler 21, and a tail lamp 22 are disposed behind the rear wheel 16. A vehicular body is surrounded by a front fender 25, a front cover 26, a front handle cover 27, a center cowl 28, a rear cowl 29 and a rear fender 31 which are disposed in this order from the front side to the rear side of the vehicular body.

In FIG. 1, reference numeral 30 indicates a stem; 32 is front break disc; 33 is a caliper: 34 is a resin spring; 35 is a front damper; 36 is a leg shield; 37 is a passenger's step; 38 is a side stand; and 39 is a main stand. On an upper side of FIG. 1, reference numeral 41 indicates a horn; 42 is a front lamp; 43 is a handlebar; 44 is a grip; 45 is a baffle duct; 46 is a radiator; 47 is a fan; 48 is a sheet; 49 is a helmet box; 51 is a helmet; 52 is a tail lamp; and 55 is a power unit case.

The power unit case 55 is composed of right and left crank cases 55b and 55a (the right crank case 55b on the back side of the figure is not shown), a transmission case 55c, an electric motor case 55d, and a reduction gear case 55e.

Figure 2:
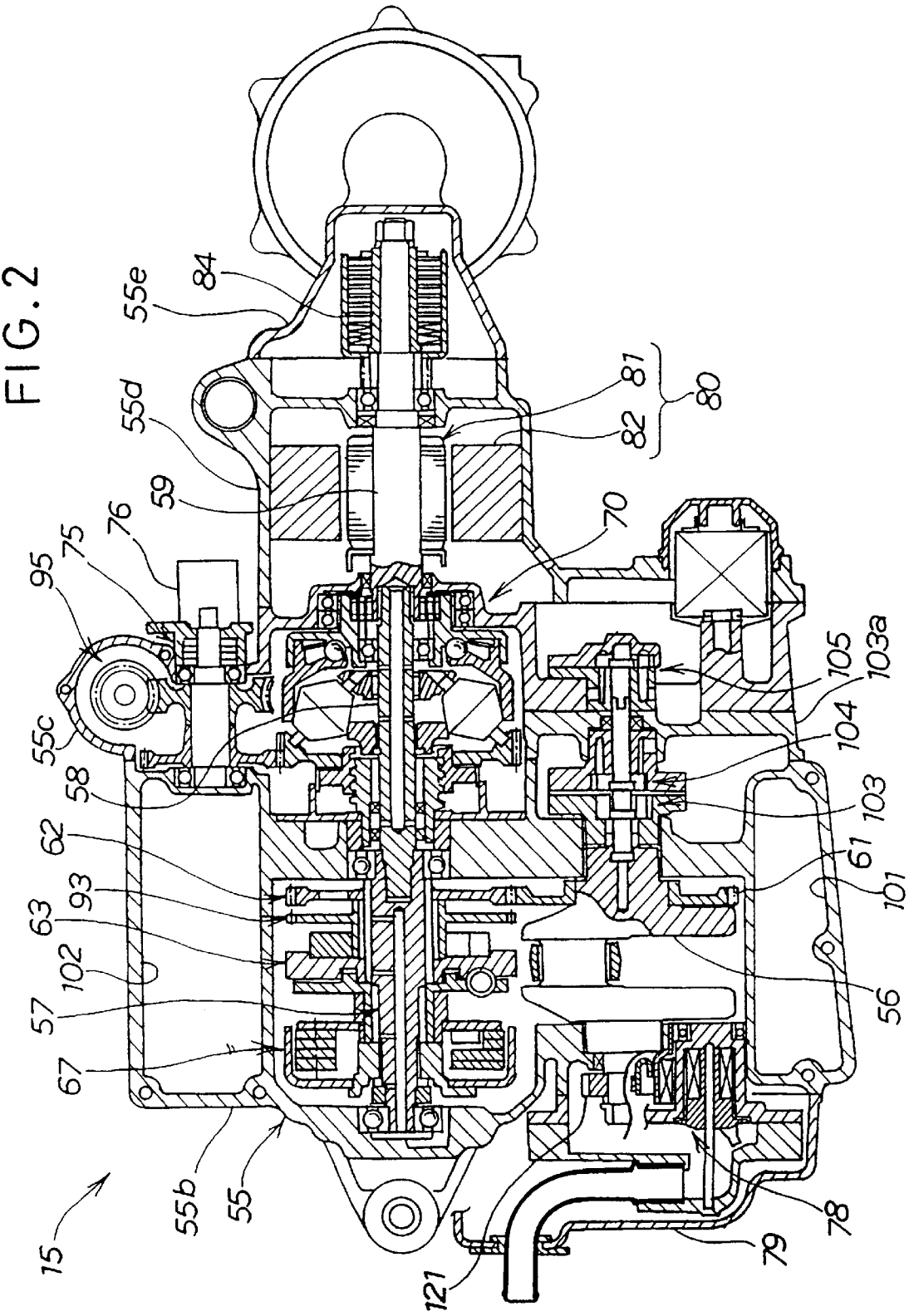
FIG. 2 is a sectional side view of a power unit according to the present invention.

FIG. 2 is a sectional side view of the power unit according to the present invention.

As will be fully described with reference to FIG. 8, the power unit 15 includes a four-cycle engine in which an intake cam shaft and an exhaust cam shaft are provided in a cylinder head. The power unit 15 has a crank shaft 56 disposed in a lower portion of the power unit case 55; a clutch shaft 57 disposed in parallel to and higher than the crank shaft 56; and a transmission shaft 58 and an electric motor shaft 59 disposed in such a manner as to extend from one end of the clutch shaft 57 in the longitudinal direction (fore and aft) of the vehicular body. That is to say, the clutch shaft 57, transmission shaft 58, and electric motor shaft 59 are disposed in series and also in parallel to and higher than the crank shaft 56.

Since the clutch shaft 57, transmission shaft 58, and electric motor shaft 59 are disposed in series in the longitudinal direction of the vehicular body, the direction of a force applied to the power unit case 55 becomes simple. This facilitates the design of the power unit case 55. Concretely, the power unit case 55 can be designed such that the rigidity is high in the direction where the force is applied and the rigidity is low in the direction where the force is not applied; and consequently, the power unit case 55 can be reduced in weight and also be made compact as a whole in proportional to simplification of the force applied to the power unit case 55.

In FIG. 2, reference numeral 75 indicates an epicycle reduction gear; 76 is a potentiometer for detecting a rotational angle of a transmission control motor 95 to be described later; 121 is a cam shaft drive pulley; 78 is a water pump driven by the pulley 121; 79 is a belt cover; and 103a is an oil pump case disposed at a lower central portion of the figure.

The details of components associated with the clutch shaft 57, transmission shaft 58, and electric motor shaft 59 will be fully described with reference to the following figure.

Figure 3:
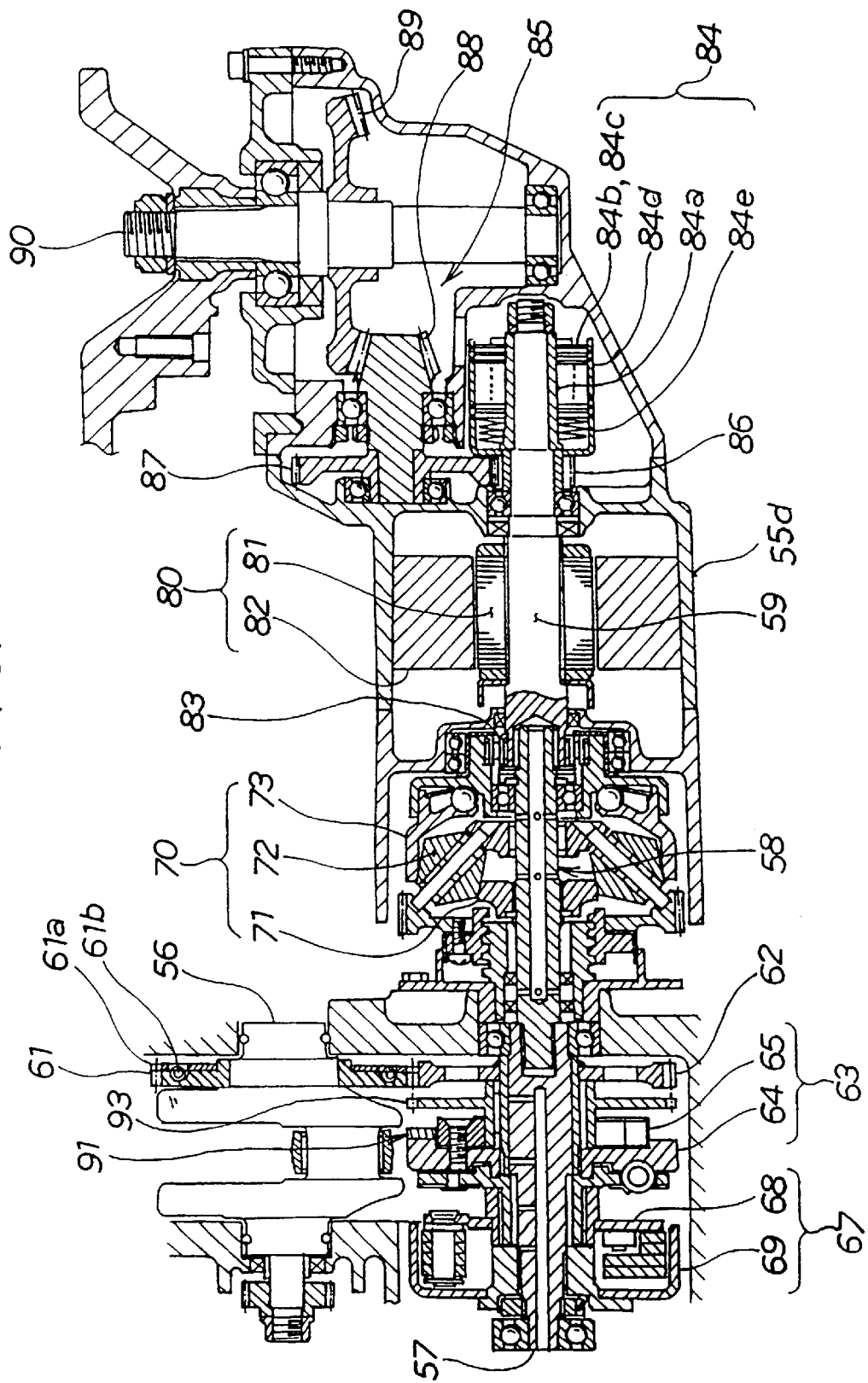
FIG. 3 is a sectional plan view of the power unit according to the present invention.

FIG. 3 is a sectional plan view of the power unit according to the present invention. The details of the components associated with the clutch shaft, transmission shaft, and electric motor shaft, and the drive force transmission configuration are described with reference to this figure.

The primary driven gear 62 rotatably mounted on the clutch shaft 57 is driven by the primary drive gear 61 mounted on the crank shaft 56. The primary driven gear 62 drives a clutch outer 64 of a one-way clutch 63 for a starter and a clutch inner 68 of the centrifugal clutch 67 independently from the clutch shaft 57. For this purpose, the primary driven gear 62 is connectable to both the clutch outer 64 of the one-way clutch 63 and the clutch inner 68 of the centrifugal clutch 67 by means of a cylindrical member 66. As the centrifugal clutch inner 68 is rotated at a rotational speed of a specific value or more, a centrifugal clutch outer 69 is rotated together with the centrifugal clutch inner 68, with a result that the clutch shaft 57 starts to be rotated.

The above primary drive gear 61 includes a phase difference adjusting sub-gear 61a and a spring 61b for preventing occurrence of gear rattle.

The transmission 70, which is of a cone type with its function fully described with reference to another figure, transmits power from the transmission shaft 58 to an inner disk 71 to a cone 72 to an outer cup 73. The rotation of the outer cup 73 is transmitted to the electric motor shaft 59 through a one-way clutch 83.

The electric motor 80 is of a coreless type, in which a permanent magnet type rotor 81 is mounted on the electric motor shaft 59 and a stator coil 82 is mounted on an electric motor case 55d.

When the centrifugal clutch 67 is turned on, a drive force is transmitted in the order of the clutch shaft 57, transmission shaft 58, transmission 70, and electric motor shaft 59, and acts to drive an axle 90 through a multi-disk type torque limiter 84 and a reduction gear mechanism 85 (which is composed of a small gear 86, a large gear 87, a small gear 88, and a large gear 89).

The multi-disk type torque limiter 84 includes a limiter inner 84a rotated together with the electric motor shaft 59, disks 84b and 84c (the disk 84b is mounted on the limiter inner 84a and the disk 84c is mounted on the following limiter outer 84d), a limiter outer 84d, and a spring 84e. The small gear 86 is integrated with the limiter outer 84d.

Power is transmitted from the limiter inner 84 to disk 84b to disk 84c to limiter outer 84d to small gear 86. If an excess torque over a predetermined value is applied, there occurs a slip between the disks 84b and 84c for protecting the components of the multi-disk torque limiter 84. The predetermined torque can be set by the spring 84e.

The one-way clutch outer 64 for a starter acts as a flywheel and has a balance weight 91 for taking an engine balance. The one-way clutch outer 64 constitutes the one-way clutch 63 for transmitting rotation of a starter in combination with the one-way clutch inner 65.

When a starter driven gear 93 is rotated by a starter (not shown), the centrifugal clutch inner 68 is rotated through the one-way clutch inner 65 and the one-way clutch outer 64, to start operation of the engine. And, when the one-way clutch outer 64 is rotated at a higher speed, it is separated from the clutch inner 65 on the low speed side.

Figure 4:
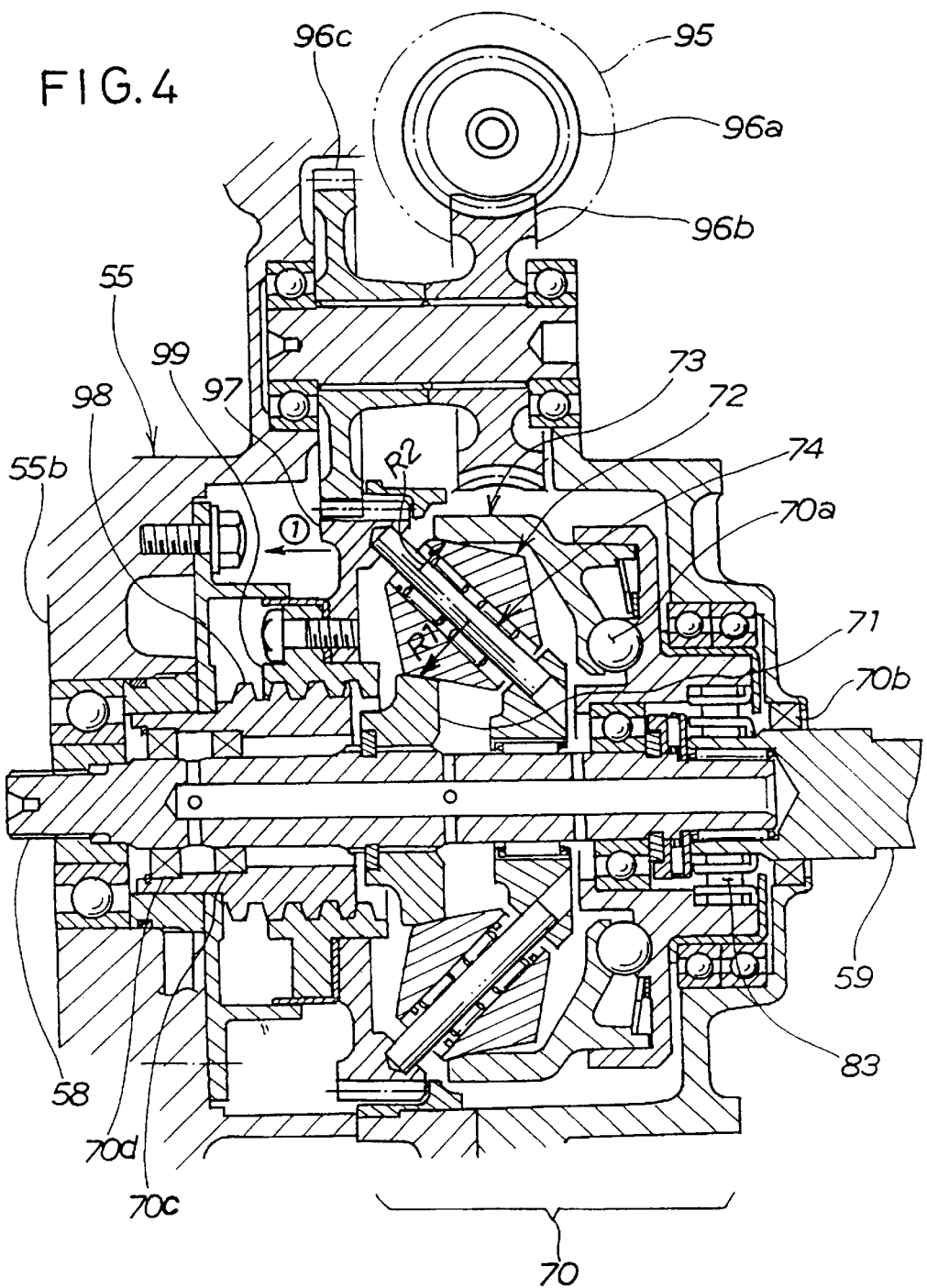
FIG. 4 is a view showing a first configuration and function of a cone type continuously variable transmission according to the present invention.
Figure 5:
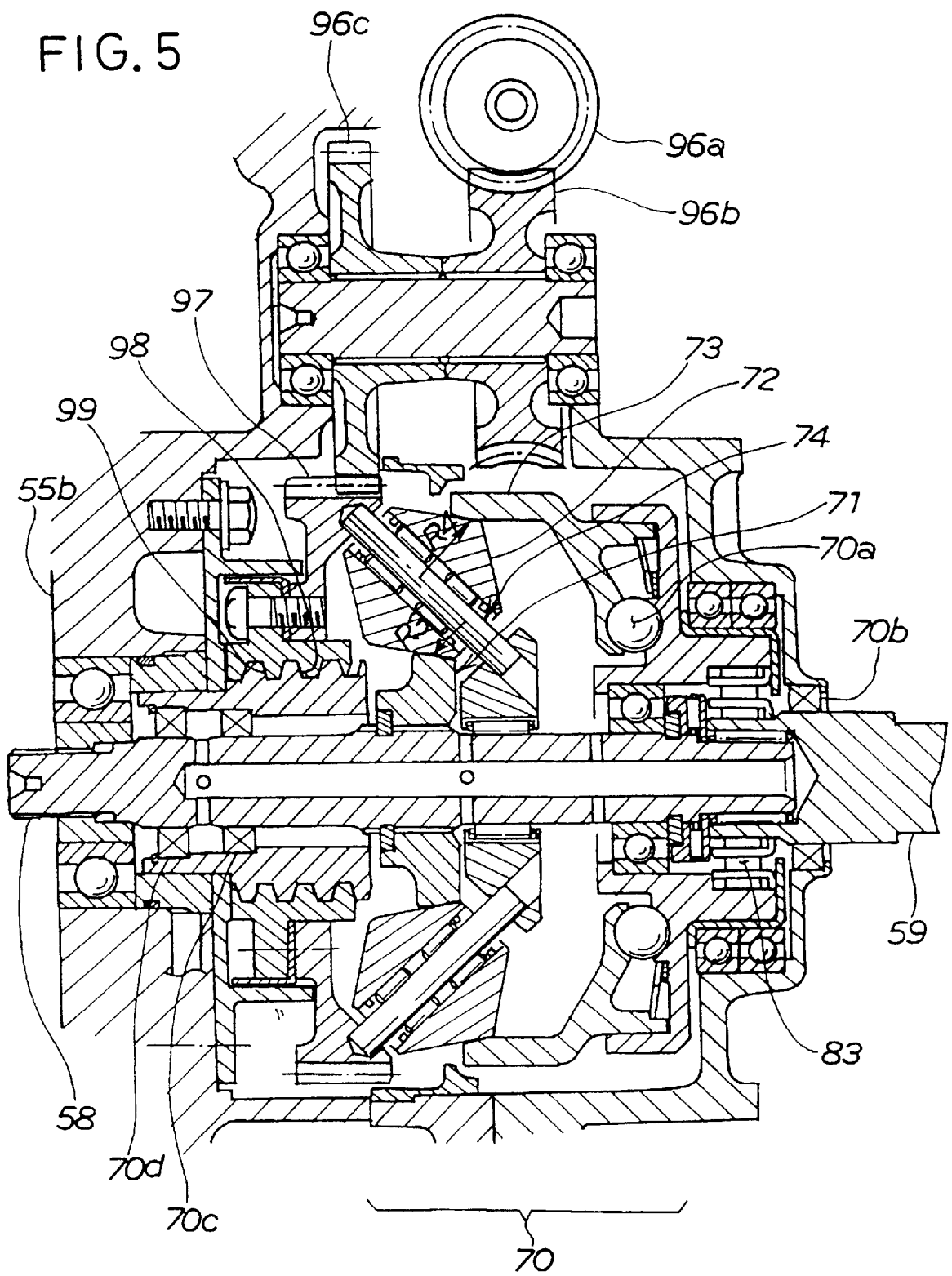
FIG. 5 is a view showing a second configuration and function of the cone type continuously variable transmission according to the present invention.

FIGS. 4 and 5 are views illustrating a configuration and a function of the cone type continuously variable transmission according to the present invention.

In the state of the cone 72 shown in FIG. 4, a relationship of R1>R2 is given, where R1 is a distance from the center of a cone supporting shaft 74 to the inner disk 71, that is, a rotational radius of the inner disk 71, and R2 is a distance from the center of a core supporting shaft 74 to the outer cup 73, that is, a rotational radius of the outer cup 73.

The cone 72 is rotated at a low speed because a large diameter portion (radius: R1) of the cone 72 is rotated by the inner disk 71, and the outer cup 73 is rotated at a low speed because the outer cup 73 is rotated by the small diameter portion (radius: R2) of the cone 72.

When rotation of the outer cup 73 is higher than that of the electric motor shaft 59, power is transmitted from the outer cup 73 to the electric motor shaft 59 through the one-way clutch 83.

Reference numeral 70a indicates a cam ball for pushing the outer cup 73 leftward along with rotation of the outer cup 73. Such a pushing action allows a contact pressure to be applied between the outer cup 73 and the cone 72.

Reference numerals 70b, 70c and 70d indicate oil seals. The oil seals 70b and 70c form a closed space for accumulating transmission oil in the transmission 70, and the oil seal 70d cuts off oil on the crank case 55b side (on the left side of the figure). Accordingly, there is no fear that oil in the crank case is mixed with transmission oil.

In the state of the cone 72 shown in FIG. 5, a relationship of R3>R4 is given, where R3 is a distance from the center of the cone supporting shaft 74 to the inner disk 71, that is, a rotational radius of the inner disk 71, and R4 is a distance from the cone supporting shaft 74 to the outer cup 73, that is, a rotational radius of the outer cup 73.

The cone 72 is rotated at a high speed because the small diameter portion (radius: R3) of the cone 72 is rotated by the inner disk 71, and the outer cup 73 is rotated at a high speed because the outer cup 73 is rotated by the large diameter portion (radius: R4) of the cone 72.

By moving the cone 72 as shown in FIGS. 4 and 5, the transmission 70 transmits rotation at a reduced speed, a uniform speed, or an increased speed.

For this purpose, as shown in FIG. 4, a control gear 97 is shifted by the transmission control motor 95 through gears 96a, 96b and 96c. The control gear 97 has a trapezoid female thread portion 99 formed on its boss portion. The trapezoid female thread portion 99 is meshed with a trapezoid male thread portion 98 fixed on the case 55 side. The control gear 97 is shifted leftward in the figure by spiral motion of the trapezoid female thread portion 99. The leftward shift of the control gear 97 moves the cone 72 leftward in the figure together with the cone supporting shaft 74 into the state shown in FIG. 5.

It is important that both the trapezoid male thread portion 98 and the trapezoid female thread portion 99 are provided not on the outer cup 73 side but on the inner disk 71 side. The cone 72 is pushed leftward in the figure by reaction of the outer cup 73. As a result, the control gear 97 is applied with a force in the direction shown by an arrow "1", that is, in the direction from the low speed side to the high speed side. With the configuration in this embodiment, the cone 72 can be shifted to the high speed side with a small torque. This is effective to lower the capacity of the transmission control motor 95.

Figure 6:
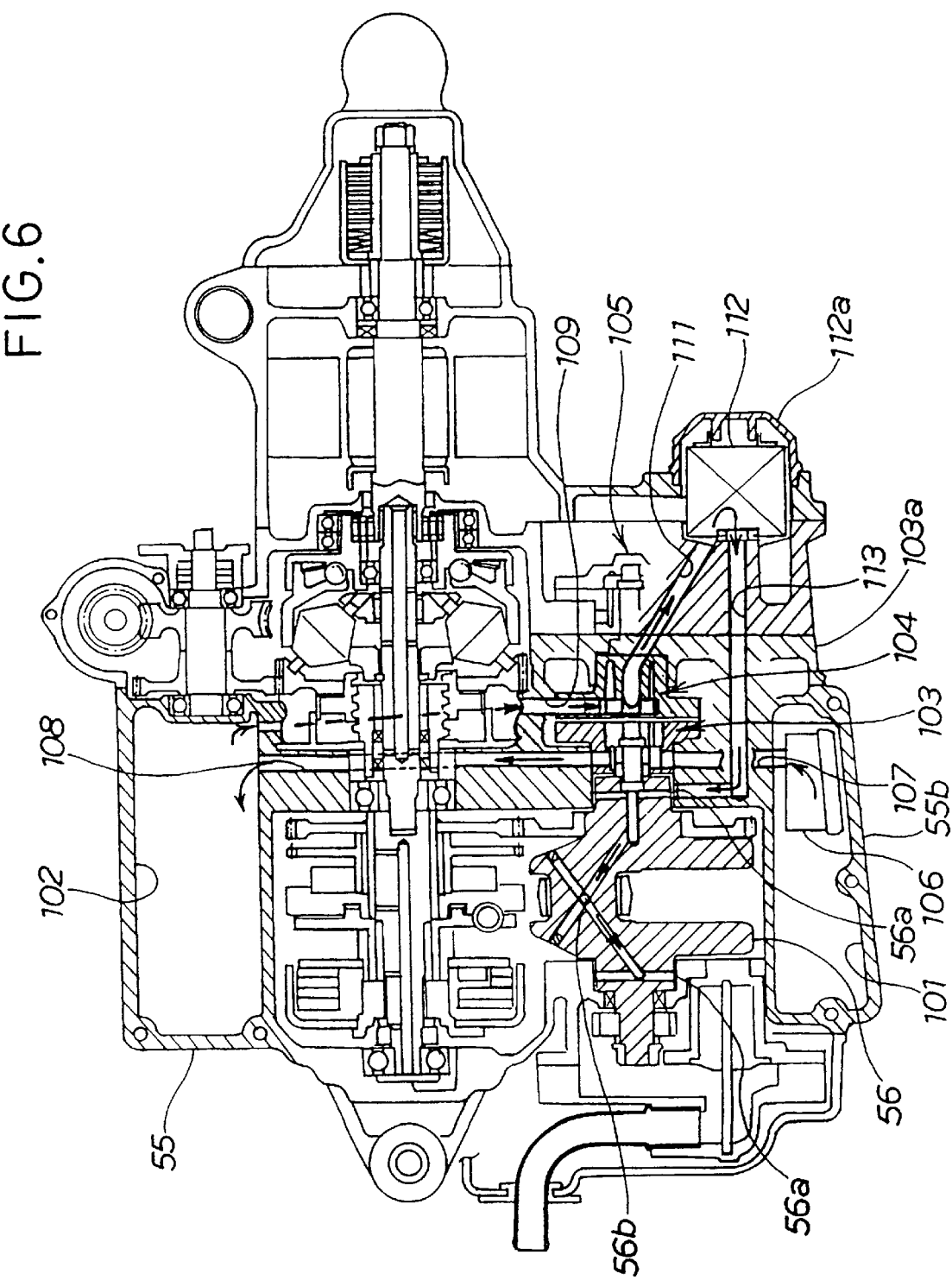
FIG. 6 is a view illustrating an engine lubricating system according to the present invention.

FIG. 6 is a view illustrating an engine lubricating system according to the present invention, in which flow of oil is indicated by an arrow.

The power unit case 55 has a lower oil tank 101 disposed at its lower portion, and an upper oil tank 102 disposed at its upper portion. A first oil pump 103, a second oil pump 104, and a third oil pump 105 are coaxially disposed on one end side (right end side) of the crank shaft 56. First, oil in the lower oil tank 101 is pumped by the first oil pump 103 through a strainer 106 and a first oil passage 107, and is supplied to the upper oil tank 102 through a second oil passage 108.

The oil in the upper oil tank 102 flows to the second oil pump 104 through a third oil passage 109 and is pressurized by the second oil pump 104. The oil thus pressurized lubricates main journal portions 56a, a connecting rod large end portion 56b, and others (particularly, a valve chamber not shown) through a forth oil passage 111, a filter 112, and a fifth oil passage 113, and returns to the lower oil tank 101. In this figure, reference numeral 112a indicates a filter cover.

Figure 7:
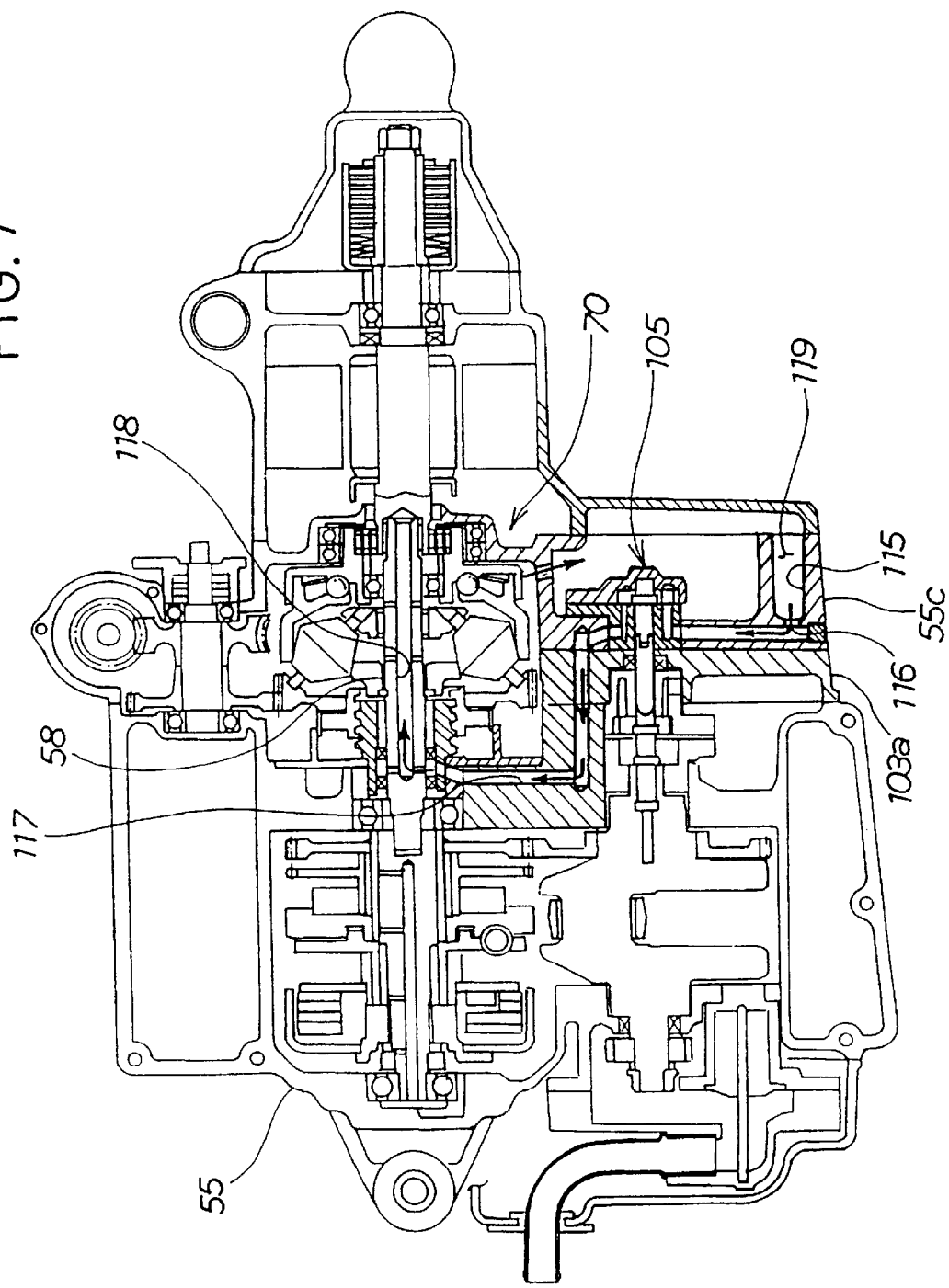
FIG. 7 is a view illustrating a transmission lubricating system according to the present invention.

FIG. 7 is a view illustrating a transmission lubricating system according to the present invention. Referring to FIG. 7, transmission oil is pumped from a transmission oil tank 115 additionally provided on a lower portion of the power unit case 55 by the third oil pump 105 through a sixth oil passage 116, being fed to the transmission shaft 58 through a seventh oil passage 117, and is supplied to the transmission 70 through an oil passage 118 in the transmission shaft 58. The oil then returns to the transmission oil tank 115 in the direction shown by an arrow in the figure, and is pumped by the third oil pump 105 through a strainer 119.

Figure 8:
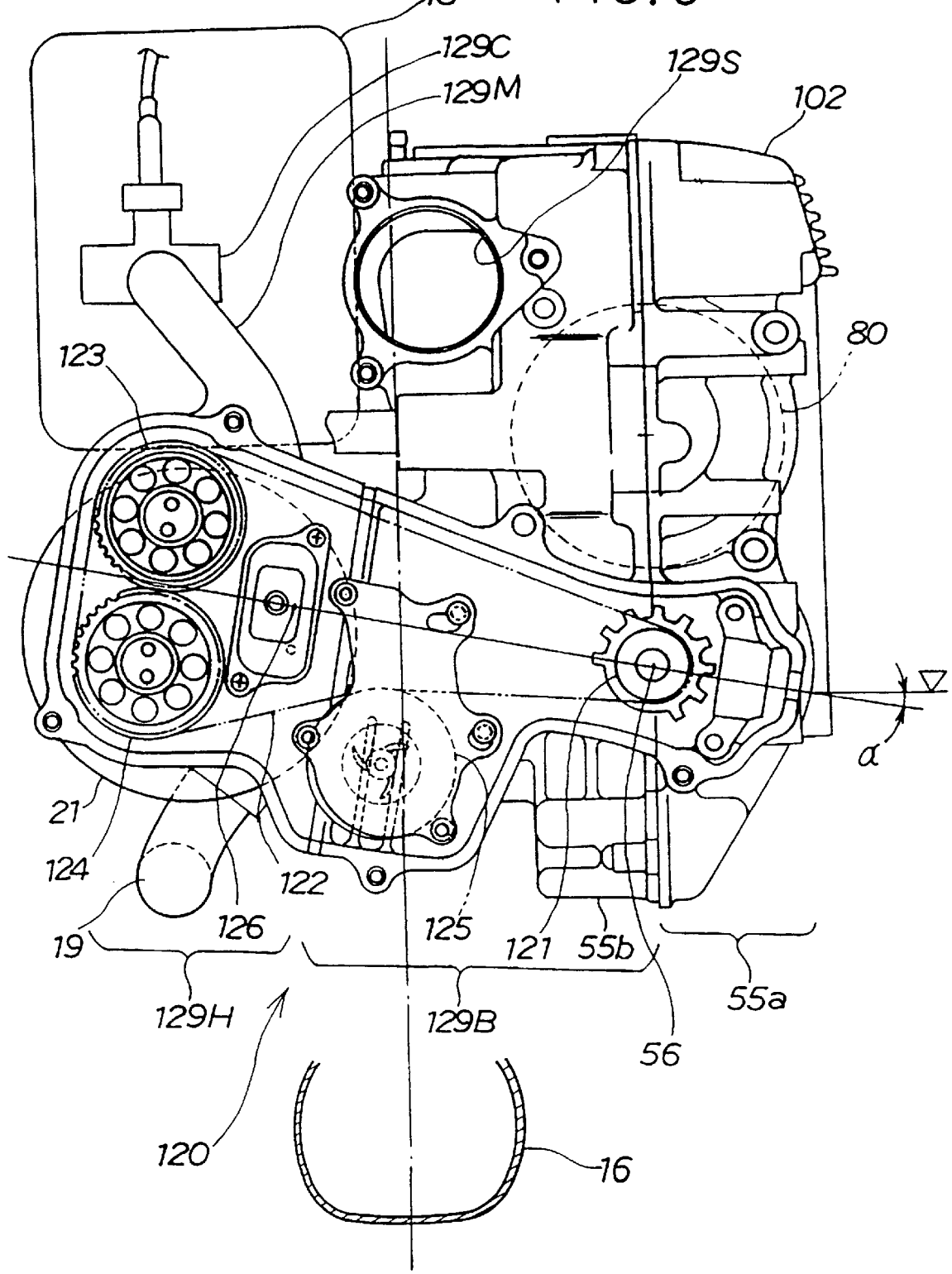
FIG. 8 is a front view of the power unit, showing a cam shaft drive mechanism as a valve drive mechanism according to the present invention.

FIG. 8 is a front view of the power unit, showing a cam shaft drive mechanism as a valve drive mechanism according to the present invention.

Referring to FIG. 8, the left crank case 55a is mounted on the right side of a cylinder block 129B integrated with the right crank case 55b, and the electric motor 80 is disposed higher than the crank shaft 56. A cylinder head 129H is mounted on the left side of the cylinder block 129B. The muffler 21 is mounted at the leading end of the exhaust pipe 19 extending from the cylinder head 129H. An intake manifold 129M extending from the air cleaner 18 on the upper left side (and on the back side of the figure) is connected to the cylinder head 129H through a carburetor 129C. Reference numeral 129S indicates a starter motor mounting hole.

In FIG. 8, since a belt cover 79 is removed, there can be seen, from the front side of the power unit 15, a cam shaft drive mechanism 120 as the valve drive mechanism composed of a cam shaft drive pulley 121, a belt 122, an intake side cam shaft pulley 123, an exhaust side cam shaft pulley 124, and a tensioner 125.

As is apparent from FIG. 8, since the cylinder is disposed in the width direction of the vehicular body with its cylinder axis 126 substantially in the horizontal direction (for example, a tilt angle a with respect to the ground is set at +10°), the center of gravity of the vehicle is lowered and also the cylinder length can be set within the vehicular width. This increased the degree of design of the vehicle.

The transmission 70 may be of an epicycle reduction gear type.

INDUSTRIAL APPLICABILITY

The present invention having the above arrangement provides the following advantages:

According to the invention, since a transmission shaft and an electric motor shaft are disposed in series in the longitudinal direction of a vehicular body, the direction of a force applied to a power unit case becomes simple. This reduces a loss of power transmission and facilitates the design of the power unit case. Concretely, the power unit case can be designed such that the rigidity is high in the direction where the force is applied and the rigidity is low in the direction where the force is not applied; and consequently, the power unit case can be reduced in weight and also be made compact as a whole proportional to simplification of the force applied to the power unit case.

According to another aspect of the invention, a clutch shaft is integrally connected to the transmission shaft, a one-way clutch is held by the transmission shaft, and a starter one-way clutch and a centrifugal clutch are held by the clutch shaft. Accordingly, the components for transmitting a drive force can be closely disposed, leading to compactness of the power unit.

According to still another aspect of the invention, the power unit is swingably mounted, together with a rear wheel, on a main frame.

With this configuration, since the power unit can be significantly reduced in weight and also the power unit is swung together with the rear wheel, the unspring weight can be reduced and the steering stability can be enhanced.

What is claimed is:

1. A motorcycle comprising an engine and electric motor are provided as a power unit and an engine output and an electric motor output are transmitted to a drive wheel through a transmission shaft and an electric motor shaft, respectively, said transmission shaft and said electric motor shaft being coaxially disposed in series in the longitudinal direction of a vehicular body and in parallel to a crank shaft of the engine.

2. A motorcycle according to claim 1, wherein said transmission shaft and said clutch shaft are integrally connected, said transmission shaft holding a one-way clutch for engaging the electric motor and said clutch shaft holding a starter one-way clutch and a centrifugal clutch.

3. A motorcycle according to claim 1, wherein said power unit is swingably mounted, together with a rear wheel, on a main frame.

* * * * *